US005909077A

United States Patent [19]

Bruhn

[11] Patent Number: 5,909,077

[45] Date of Patent: Jun. 1, 1999

[54] BRUSH HAVING INCLINED GROOVED CONTACT SURFACE

[75] Inventor: Rainer Bruhn, Ingersheim, Germany

[73] Assignee: ITT Manufacturing Enterprises, Inc., Wilmington, Del.

[21] Appl. No.: 08/860,644

[22] PCT Filed: Jan. 2, 1996

[86] PCT No.: PCT/EP96/00001

§ 371 Date: Oct. 21, 1997

§ 102(e) Date: Oct. 21, 1997

[87] PCT Pub. No.: WO96/21260

PCT Pub. Date: Jul. 11, 1996

[30] Foreign Application Priority Data

Jan. 3, 1995 [DE] Germany ........................... 195 00 016

[51] Int. Cl.[6] ........................... H02K 13/00

[52] U.S. Cl. ........................... 310/251; 310/248; 310/252; 310/51

[58] Field of Search ........................... 310/251, 245, 310/252, 51

[56] References Cited

U.S. PATENT DOCUMENTS

| | | | |
|---|---|---|---|
| 2,296,366 | 10/1942 | Redmond | 310/251 |
| 3,467,846 | 9/1969 | Reille | 310/251 |
| 5,019,741 | 5/1991 | Fukui et al. | 310/251 |
| 5,414,319 | 5/1995 | Nowicki et al. | 310/248 |

FOREIGN PATENT DOCUMENTS

| | | | |
|---|---|---|---|
| 2437710 | 4/1980 | France | 310/248 |
| 1178506 | 9/1964 | Germany | 310/248 |
| 1538982 | 1/1970 | Germany | 310/251 |
| 7626775 | 12/1970 | Germany . | |
| 7917605 | 11/1980 | Germany . | |
| 55-109155 | 8/1980 | Japan | 310/251 |
| 1092630 | 5/1984 | U.S.S.R. | 310/248 |
| 1255501 | 12/1971 | United Kingdom | 310/251 |

OTHER PUBLICATIONS

German Search Report for Application No. 195 33 031.5 dated Dec. 27, 1995.

English translation of the International Preliminary Examination Report of Application No. PCT/EP96/00001 filed Jan. 2, 1996.

*Primary Examiner*—Nestor Ramirez
*Assistant Examiner*—Karl Tamai
*Attorney, Agent, or Firm*—J. Gordon Lewis

[57] ABSTRACT

The invention describes a carbon brush for an electrical machine. Carbon brushes of this type need to fulfill two requirements. First, the carbon brush should be as resistant to abrasion as possible. Second, as little noise as possible should be generated at the brush/collector crossover during the operation of the motor. Consequently, the invention proposes to bevel the face surface of the carbon brush, and to provide the face surface with transverse grooves within its lower region.

6 Claims, 1 Drawing Sheet

BRUSH HAVING INCLINED GROOVED CONTACT SURFACE

TECHNICAL FIELD

The invention pertains to a carbon brush for an electrical machine having a collector.

BACKGROUND OF THE INVENTION

Numerous brushes of this type have been disclosed, e.g., in DE 31 48996.

One problem in the construction of such brushes can be seen in the fact that the unit consisting of the brush and the collector generates noise during the operation. This noise is caused by the contact surface of the brush sliding along the surface of the collector such that the lamellar structure of the collector surface induces vibrations that cause airborne sound that are perceived as noise. Numerous proposals pertaining to the reduction of this noise have been disclosed. In all new proposals, it must be observed that the contact resistance between the brush and the collector cannot be excessively small. In addition, the brush should have a sufficient resistance to abrasion, i.e., the brush cannot be excessively soft.

According to one proposal, the contact surface is inclined relative to the axis of the collector or the outer surface of the collector. In this case, the contact surface is correspondingly beveled. However, this results in a sharp-edged transition between the contact surface and the lower lateral edge of the brush, i.e., the brush merely adjoins the collector with one edge during the initial phase of operation.

In brushes of this type, the hard surface produced during the pressing of the graphite mixture is usually not removed and the attainable noise reduction is quite low. If the surface skin of the brush is removed after the pressing, it is possible that the edge will break.

It is also known to provide the contact surface of the brush with longitudinal grooves over the entire surface. These grooves extend in the transverse direction, i.e., in the circumferential direction of the collector. However, this measure results in an insignificant reduction in the noise level.

According to the invention, it is proposed to incline the contact surface relative to the axial direction of the collector, and to provide the contact surface with one or more grooves that extend in the transverse direction within the lower region, with said grooves being machined into the surface while the hard surface skin is simultaneously removed.

It was established that two or three grooves are sufficient, with the lowest groove being open toward the bottom. The contact surface is curved in accordance with the cylindrical surface of the collector. The incline of the contact surface relative to the outer surface of the collector lies on the order of 6–10 degrees, preferably at approximately 8 degrees. The ideal incline depends on the fact that electric currents should be transmitted by the brush, as well as other factors.

For example, ideal inclination decreases proportionally with the intensity of the electric currents to be transmitted.

DETAILED DESCRIPTION OF THE PREFERRED EMBODIMENT

Figure 1B:
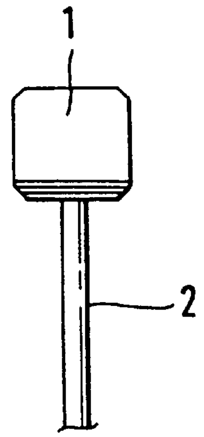
FIG. 1*a* , 1*b* and 1*c* show a carbon brush viewed from different directions.
Figure 1A:
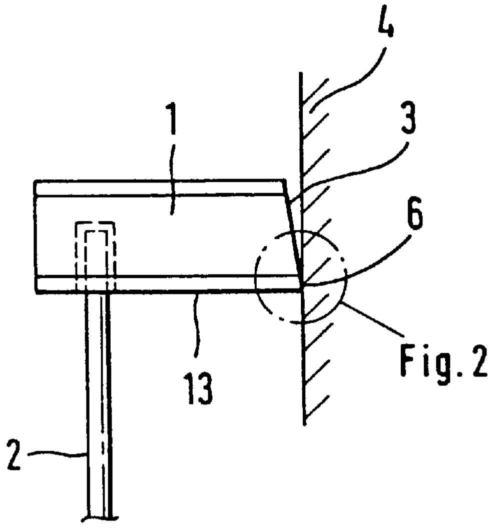

The carbon brush 1 shown in the figures consists of an oblong cuboid body that has an approximately square shape if viewed from a cross section (FIG. 1*b*) and an approximately rectangular shape if viewed from a longitudinal section (FIG. 1*a*).

Such a carbon brush is provided with a shunt 2 that serves as the conductor for delivering electrical current to brush 1. The brushes are guided in cartridge-type brush holders that are arranged on a brush carrier plate.

One surface of the brush, namely, the contact surface 3, is in contact with the outer surface of a collector 4 after the assembly of the motor.

The embodiment comprises a cylindrical collector, with the contact surface of the collector being arranged on its outer surface. The contact surface 3 of the brush 1 is in contact with the outer surface/contact surface of the collector 4.

Figure 1C:
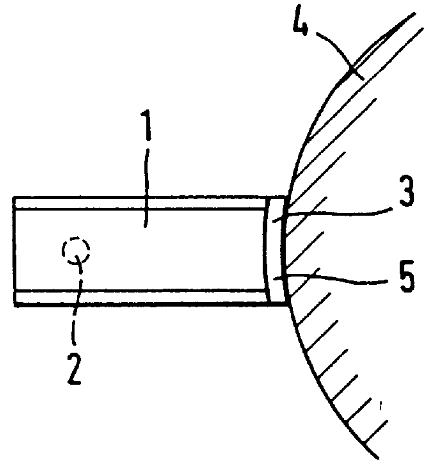

The contact surface 3 of the brush 1 is realized by curving the contact surface 3 in the transverse direction, i.e., in the circumferential direction of the collector, as shown in FIG. 1*c*. In this case, the curvature essentially corresponds to the radius of the collector 4.

The contact surface 3 is inclined relative to the outer surface of the collector 4 in the axial direction. Consequently, a wedge-shaped gap 5 is formed between the outer surface of the collector 4 and the contact surface 3 of the brush 1. The lower edge 6, i.e., the edge that adjoins the outer surface of the collector 4, is provided with one or more grooves 10, 11, 12 that extend over the entire width of the contact surface 3 in the transverse direction.

The brush is preferably positioned in the cartridge-type brush holder in such a way that the lower edge 6 is situated near the brush carrier plate. However, it is also possible to position the brush in such a way that the lower edge is situated at a certain distance from the brush carrier plate.

Figure 2:
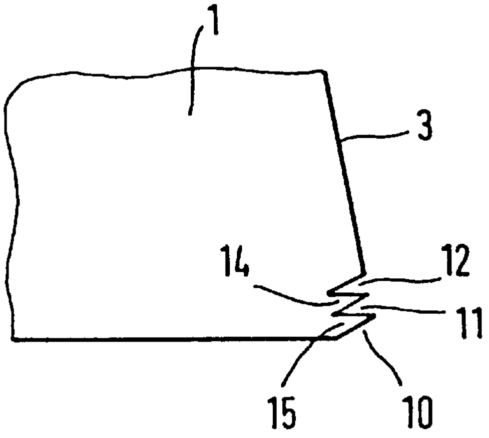
FIG. 2 shows a portion of the carbon brush illustrated in FIG. 1*a* in greater detail.

FIG. 2 shows that the grooves 10, 11, 12 form an acute angle so that they have a triangular profile if viewed from a cross section. In this case, the lowest groove 10 is open toward the bottom, i.e., this groove is merely beveled relative to the underside 13 of the brush 1.

The brushes are manufactured as described below.

Blanks are pressed from a mixture that essentially consists of graphite. After being pressed, the blanks are sintered. During the sintering process, a hard layer or surface skin that is formed needs to be removed by sanding or milling, at least within the region of the contact surface 3. The layer situated on the longitudinal sides of the brush can be removed accordingly.

The contact surface 3 is subsequently beveled as described above, with a corresponding curvature in the circumferential direction being attained by selecting the proper tool. Subsequently, one or more grooves that extend in the transverse direction are machined into the lower edge.

A motor provided with a carbon brush of this type generates very little noise. In most instances, the protruding edges 14, 15 are removed during test runs of the motor. Consequently, the brush is, beginning at the lower edge, gradually shaped such that it is adapted to the outer surface of the collector.

It was established that a motor generates very little noise in this fashion.

It should also be mentioned that the contact surface 3 should include an approximate angle of 6–10 degrees with the outer surface of the collector.

I claim:

1. A carbon brush for an electrical machine, the carbon brush comprising:

a body having a shunt extending from a location proximate to a first end of a bottom surface of the body and having a contact surface located distally from the first end, the contact surface arranged to be brought into contact with a collector, wherein the contact surface is inclined relative to an axial direction of the collector and contoured according to a contour of the collector, and wherein a lower portion of the contact surface is provided with at least one groove extending across the contact surface tangentially to a surface of the collector;

wherein a groove proximate to the bottom surface of the body is open toward the bottom surface.

2. A carbon brush according to claim 1, wherein the contact surface is curved in accordance with the radius of the collector.

3. A carbon brush according to claim 1, wherein the at least one groove has a substantially triangular cross section.

4. A carbon brush according to claim 1, wherein the contact surface is inclined relative to the axial direction of the collector by approximately 6–10 degrees.

5. A carbon brush according to claim 1, wherein the contact surface is inclined relative to the axial direction of the collector by 8 degrees.

6. A carbon brush according to claim 1, wherein the lower portion of the contact surface is formed with the at least one groove.

* * * * *